United States Patent [19]
Celani

[11] 3,817,280
[45] June 18, 1974

[54] REGENERATION GAS DISTRIBUTOR GRID

[75] Inventor: Pasquale J. Celani, Hopewell, N.J.

[73] Assignee: Mobil Oil Corporation, New York, N.Y.

[22] Filed: Mar. 20, 1973

[21] Appl. No.: 343,080

[52] U.S. Cl.................. 137/592, 34/57 A, 137/601
[51] Int. Cl.............................................. F17d 1/04
[58] Field of Search.......... 34/57 R, 57 A, 170, 174; 137/592, 608, 601; 239/557; 261/124

[56] References Cited
UNITED STATES PATENTS

| | | | |
|---|---|---|---|
| 2,593,867 | 4/1952 | Eweson | 34/174 |
| 2,628,158 | 2/1953 | Wilcox et al. | 137/608 |
| 2,798,030 | 7/1957 | Hettick et al. | 34/57 A |
| 2,886,899 | 5/1959 | Watkins | 34/57 A |
| 2,933,824 | 4/1960 | Jones | 34/57 A |
| 2,934,411 | 4/1960 | Purse | 34/57 A |
| 3,091,594 | 5/1963 | Borey | 34/57 A |
| 3,677,715 | 7/1972 | Morrison et al. | 34/57 A |

Primary Examiner—Alan Cohan
Assistant Examiner—George L. Walton
Attorney, Agent, or Firm—Andrew L. Gaboriault; Carl D. Farnsworth

[57] ABSTRACT

The apparatus and system for distributing regeneration gas across the lower cross section of a fluid bed of particles to be regenerated is described wherein a distributing grid comprising individual distributing grid segments radiating substantially horizontally from a regeneration gas central manifold are individually controlled by valve means in conduit means communicating with the individual distributing grid segments.

3 Claims, 2 Drawing Figures

PATENTED JUN 18 1974 3,817,280

REGENERATION GAS DISTRIBUTOR GRID

BACKGROUND OF THE INVENTION

The technology of contacting finely divided solid particles with gasiform material to obtain conversion of the solid particles, extraction of the particles or the removal of deposited materials therefrom wherein the solids are maintained in a dense fluid phase condition are plagued with problems associated with obtaining a relatively uniform contact between supplied gasiform material and solid particle material. Thus in large dense fluid bed operations such as employed in the regeneration of catalyst, means for obtaining a uniform distribution of regeneration gas throughout the catalyst bed to obtain a uniform removal of carbonaceous deposits has been a source of constant investigation to obtain improved results. The problems of regenerating catalyst have been aggravated with the development of more active and selective cracking catalysts; that is, cracking catalysts that are more selective at high temperatures and of low coke producing characteristics. Furthermore, to take advantage of the catalyst potential for converting hydrocarbons, it is important to obtain a uniform and substantially complete removal of deposited carbonaceous material before return thereof at an elevated temperature to the hydrocarbon conversion step. The present invention is concerned with the method and apparatus for exercising control on the distribution of gasiform material introduced to the bottom portion of a bed of finely divided solid particle material maintained in a fluid bed condition to obtain regeneration thereof.

SUMMARY OF THE INVENTION

The present invention is particularly concerned with the method and apparatus for contacting finely divided solid particle material with a gasiform material under selected operating conditions. In a more particular aspect the present invention is concerned with the regeneration of finely divided solid catalyst particles to obtain a removal of carbonaceous deposits by burning in the presence of an oxygen containing gasiform material. In the method and system of the present invention, the solid catalyst particles are regenerated in a dense fluid bed condition to which regeneration gas is supplied to the lower portion thereof by a plurality of radiating distributing grids individually controlled with respect to the volume of regenerating gas passed therethrough.

The plurality of radiating distributing grids of the present invention extend substantially horizontally outwardly from a central regeneration gas inlet conduit projecting upwardly into the bottom portion of a regeneration vessel. Each radiating grid segment is provided with a horizontally disposed regeneration gas distributing conduit from which a plurality of spaced apart distributing pipes extend at a right angle thereto to fill a segment of the cross-sectional area of the regeneration vessel. In the arrangement herein discussed, the cross-sectional area of the vessel is separated into six segments and each segment is provided with its own distributing grid as herein explained. In addition to the above, each segment is provided with a support conduit extending upwardly and outwardly from the main vertically disposed regeneration gas inlet conduit to the horizontally disposed distributing conduit and is in open communication therebetween to permit the flow of regeneration gas therethrough. Thus the supply of regeneration gas to the outer portion of each distributing segment is augmented by the open end support conduit above identified. The regeneration gas distributing pipes closed at the outer end thereof are provided with a plurality of nozzles throughout the length of the pipe on the bottom side thereof through which the regeneration gas is introduced for flow upwardly through the bed of solids thereabove.

In the arrangement of the present invention, each horizontal distributing conduit and each support conduit communicating therewith is provided with valve means at the inlet of each conduit adjacent the substantial vertical gas inlet conduit projecting upwardly into the bottom portion of the vessel. Furthermore, the vertically aligned valve means associated with each distributing gas segment are controlled by a vertically extending rod means associated with the valves which are coupled to control means extending through the wall of the vertical gas feed conduit external to the vessel. Thus the valve means at each inlet may be simple butterfly valves or plates connected to the vertical rods and positioned with respect to the radiating conduit inlets to permit altering the flow of regeneration gas therethrough by partially or completely covering the inlet. Complete coverage of the inlet is not necessary.

In the regeneration of solid particle material, such as finely divided catalyst particles, it is known that temperatures within the range of 800° to 1,400°F. may be employed with it being preferred to regenerate catalyst for cracking operations at temperatures in excess of 1,100°F. and usually at temperatures of at least 1,200°F. On the other hand, some solids may not need to be heated to such a high temperature to accomplish the results desired. Furthermore, the operating pressure may be about atmospheric or considerably higher and up to about 100 or 200 psig. Similarly the regeneration of catalyst for cracking operations is accomplished at atmospheric pressures or pressures up to about 50 or 100 psig. The velocity of the gasiform material passed into the bed of solids may vary over a considerable range and will be controlled to obtain a desired dispersion of solids in upflowing gasiform material. Thus depending on the density of the fluid bed of solids desired, the gasiform material will be introduced to provide a velocity within the range of 0.5 up to 5, 10 or higher feet per second. More usually the velocity of the gasiform material such as regeneration gas used to remove carbonaceous deposits by burning is sufficient to maintain the solid particle materials of from 40 micron size up to about 100 micron particle size as a fluid bed of solid in suspended dispersed phase condition resembling a boiling liquid. It may be a dense fluid catalyst bed operation or a more dispersed catalyst phase operation.

DISCUSSION OF SPECIFIC EMBODIMENTS

Figure 1:
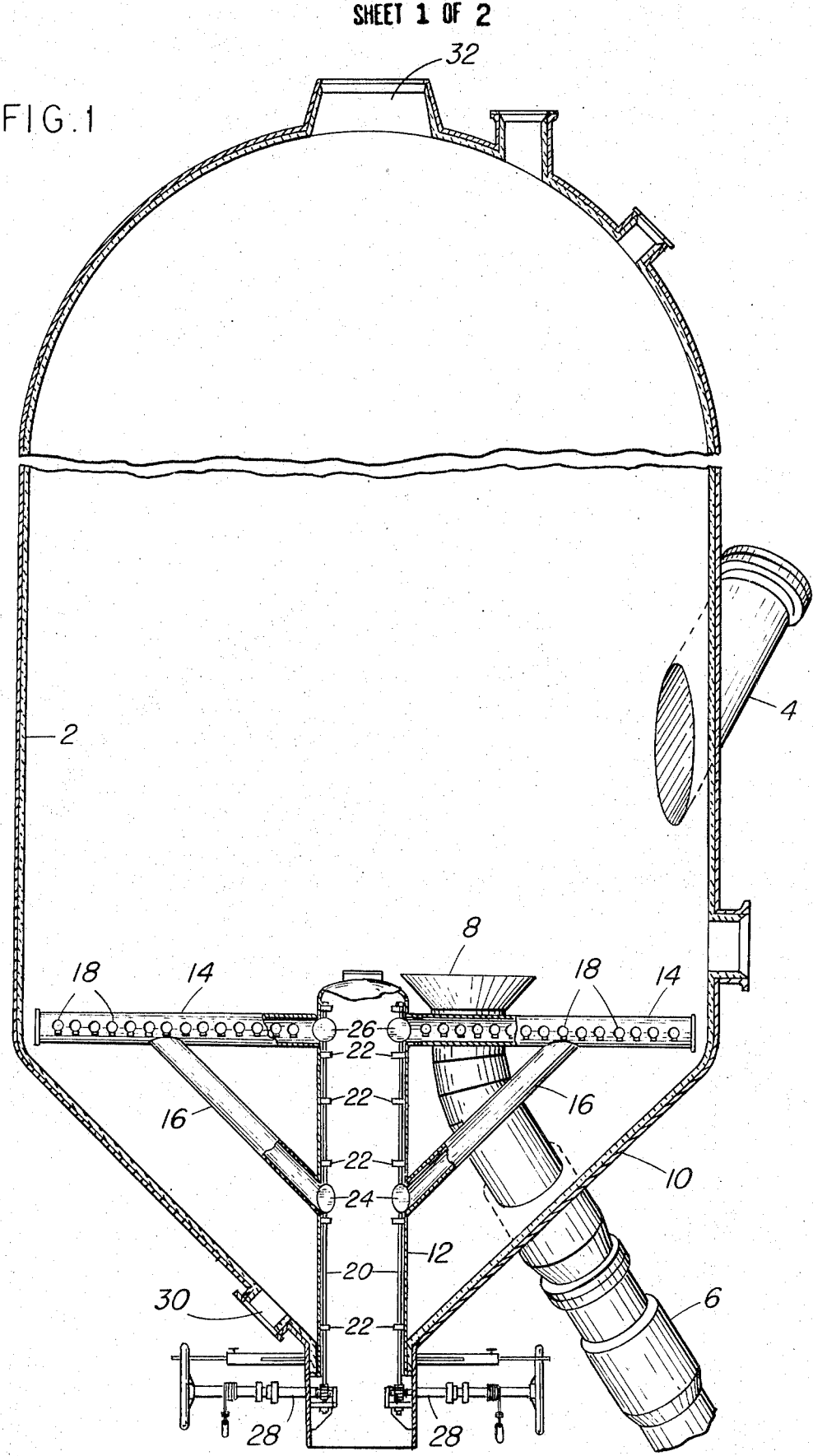
FIG. 1 is a cross-sectional view in elevation of a vessel suitable for regenerating finely divided solid particles particularly showing the distributor grid in cross section with means for controlling the flow of gas through conduits extending outwardly from the main gas supply conduit.

Referring now to FIG. 1 by way of example, there is shown in elevation a regeneration vessel encompassing the essential features of the present invention and comprising a regeneration gas distributor means with flow control valve means in the inlet of each supply conduit to a given regeneration gas distributing means. In the arrangement of FIG. 1, a regenerator vessel 2 is shown. Cyclone means with connecting diplegs normally positioned in the upper portion of a regeneration vessel are not shown to simplify the drawing. A catalyst inlet conduit 4 is provided for introducing spent catalyst containing carbonaceous deposits to the regeneration vessel. The conduit 4 may be positioned to provide for tangential introduction of the finely divided catalyst particles to the regeneration vessel. A conduit 6 extending upwardly into the vessel and terminating in a funnel shaped mouth 8 above the distributor grid provides means for withdrawing regenerated catalyst from the vessel. The bottom of the regenerator vessel 2 is provided with a conical bottom 10. A regeneration gas inlet conduit or manifold 12 concentrically extends upwardly through the conical bottom of the vessel and terminates at a level substantially coinciding with the lowest vertical wall portion of the vessel. A plurality of conduit means 14 extend substantially horizontally outwardly from said vertically extending concentric manifold to provide a grid means more clearly identified in FIG. 2. Support conduits 16 in open communication with conduits 12 and 14 provide structural support to the grid means of FIG. 2 in addition to providing additional regeneration gas to outer portions of each segment of the distributing grid. Pipe means 18 horizontally extends substantially at right angles to distributing conduits 14 as shown more clearly in FIG. 2. Vertical rods 20 retained by bearings 22 adjacent the inner wall of manifold pipe 12 are provided with disc shape plates 24 and 26 which are valve means for adjusting the flow of gases passing from manifold 12 into either conduit 14 or 16. Thus by turning the rods, the disc shaped plates attached thereto may be turned to provide a restricted flow of gas into the pipe or a substantially unrestricted flow of gas into the pipe. The bottom end of each rod is provided with a gear in matching engagement with a work gear on the end of an adjusting rod 28 extending through the wall of inlet pipe 12 external to the vessels conical bottom 10. The adjusting rod is provided with a hand wheel on the outside end thereof and means are provided for locking the hand wheel in a selected position. A covered manhole 30 is provided in the lower portion of the conical bottom 10.

In the apparatus of FIG. 1, the regeneration gas enters the bottom of the vessel by vertically extending conduit 12 and passes out through conduits 16 and 14 to distributor pipes 18 with the flow through each conduit 16 and 14 controlled by disc valves 24 and 26 rigidly attached to adjusting rod means 20. The regenerating gas passed to pipes 18 then passes out through holes or nozzles along the bottom surface of the pipes and then upwardly through a bed of catalyst to be regenerated under fluid phase regeneration conditions. Regenerated catalyst is withdrawn from the vessel above the grid by conical inlet 8 communicating with conduit 6. The inlet to withdrawal conduit 6 may be as shown in FIG. 1 or it may be extended upwardly into the vessel so that regenerated catalyst is withdrawn from an upper portion of the dense fluid bed of catalyst rather than a lower portion therof as shown. Regeneration gas after passing through suitable cyclone separators not shown and positioned in an upper portion of the regenerator pass into a plenum chamber not shown and then out the top of the regenerator vessel as by opening 32.

Figure 2:
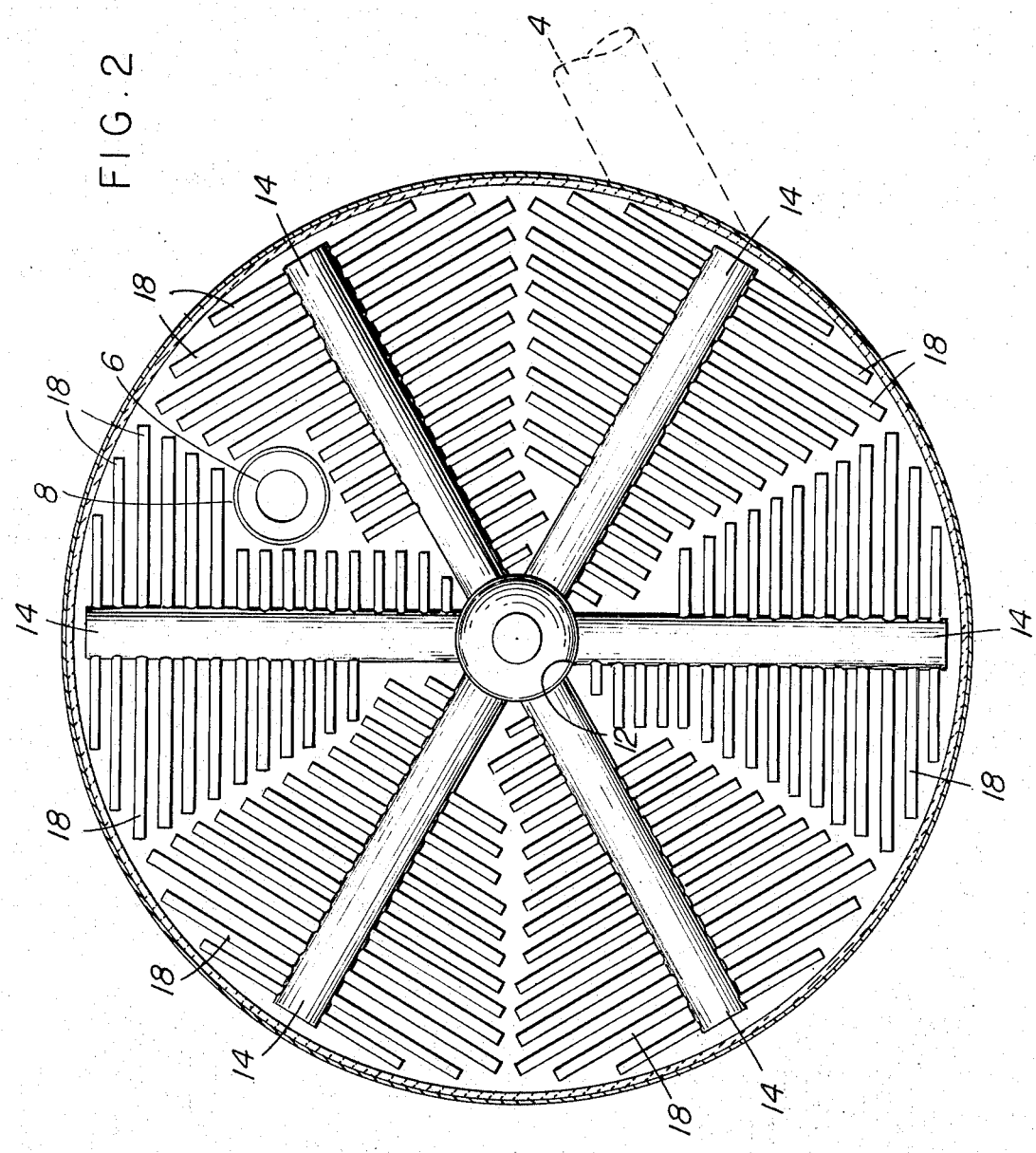
FIG. 2 provides a top cross sectional view of the segmented distributor grid of FIG. 1.

In the arrangement of FIG. 2 there is shown the segmented regeneration gas distributor grid comprising pipes 18, distributing conduits 14 and concentric regeneration gas inlet conduit 12 which is closed at its upper end positioned within vessel 2. Catalyst withdrawal funnel 8 connected to conduit 6 is shown positioned between two of the segmented distributing grids. The dotted conduit 4 at the side of the drawing is intended to show the relationship of the catalyst inlet conduit 4 to the withdrawal funnel 8.

Having thus provided a discussion of the apparatus and system of the present invention and described the method for using the apparatus, it is to be understood that no undue restrictions are to be imposed by reason thereof except as defined by the following claims.

I claim:

1. An apparatus comprising in combination a vessel provided with a top head and a conical bottom, means for withdrawing gasiform material through said top head, a first concentric conduit closed at its upper end extending upwardly through said conical bottom into said vessel, a plurality of second conduits in open communication with said first conduit in an upper portion thereof extending radially outwardly towards said vessel wall, said second conduits being closed at their outer ends and being substantially uniformly spaced from one another about the vessel cross section, a plurality of third conduit gas distributing means closed at their outer ends horizontally extending at substantially right angles from each of said second conduit means to form separate segments of a cross sectional fluid distributor grid; open ended support conduits communicating with an outer portion of said radiating second conduit and a lower portion of said concentric conduit, vertically extending rod means within said concentric conduit provided with separate fluid flow control valve means attached thereto at the open inlet to said radiating conduit and said support conduit combination, means external to said concentric conduit for adjusting said rod means with fluid flow control means and separate conduit means for adding and withdrawing solid particle material from said vessel above said grid means.

2. The apparatus of claim 1 wherein said third conduit gas distributing means are closed at the end remote from said second conduit to which attached and are provided along the bottom surface thereof with a plurality of spaced apart fluid distributing holes.

3. The apparatus of claim 1 wherein the valve means at the open inlet to each radiating conduit and support conduit are provided with control means for controlling the flow of fluid through each vertical combination thereof.

* * * * *